Aug. 25, 1942.                E. MEIEROTT                2,294,192
                    ELECTRIC CIRCUIT CLOSING DEVICE
                         Filed July 29, 1941
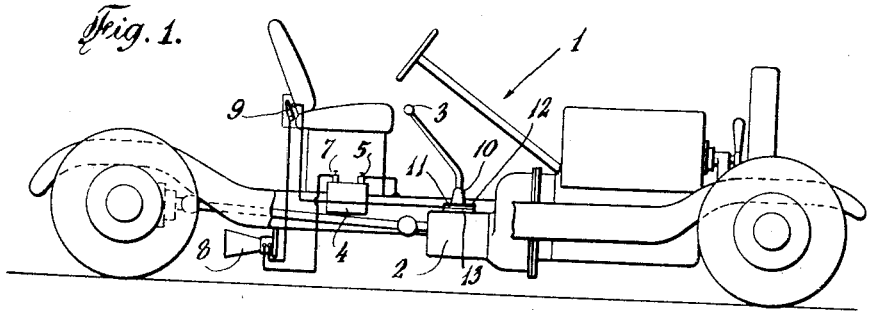
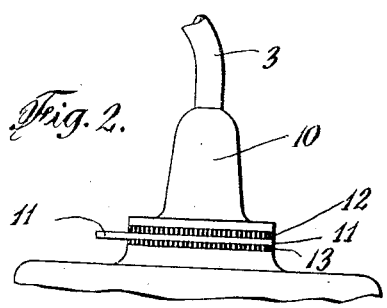
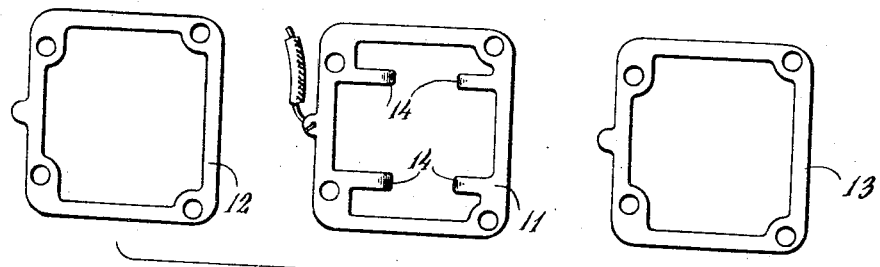
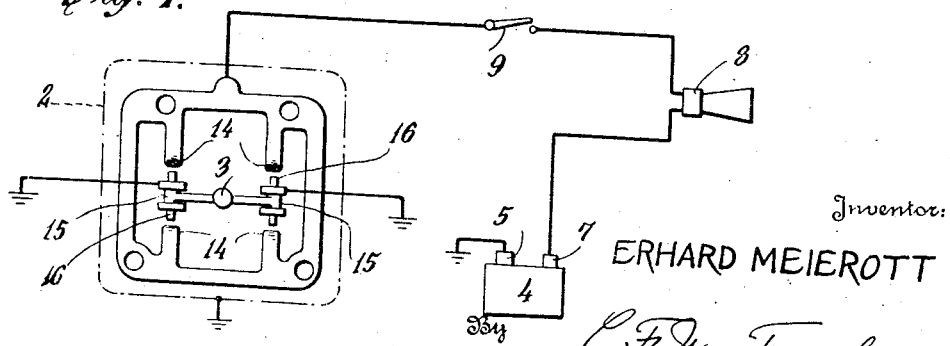
Inventor:
ERHARD MEIEROTT
C. F. Wm. Forssberg.
         Attorney.

Patented Aug. 25, 1942

2,294,192

UNITED STATES PATENT OFFICE 2,294,192

ELECTRIC CIRCUIT CLOSING DEVICE

Erhard Meierott, Brooklyn, N. Y.

Application July 29, 1941, Serial No. 404,537

6 Claims. (Cl. 200—59)

This invention relates to electric burglar alarms for automobiles which will operate upon the mere attempt to seize the car by any unauthorized party.

The main object of my invention is to provide an electric alarm system which will automatically and positively start operating a warning signal when an attempt is made to start a car moving from its location, so that it will be evident to everyone that the car is being taken by a party having no authority to do so.

Another object is to have such an alarm which cannot be reached quickly or conveniently by a thief in order to silence the same.

A further object is to include certain of the normal operating parts of the car as operating or starting members for the alarm which cannot be avoided in operation of the car.

It is also an object to have an alarm system which is readily installed on any automobile and is also easy to make and therefore low in cost.

Other objects and the various advantages of my invention will appear more fully as this specification proceeds.

In the accompanying drawing forming part hereof:

Figure 1 is a diagrammatic elevation of part of an automobile with the alarm embodying the invention installed thereon.

Figure 2 is an enlarged fragmentary view of the upper part of a gear shift casing and cover therefor with parts of the invention included.

Figure 3 illustrates the same parts of the invention in spaced or exploded positions.

Figure 4 is a circuit diagram which is useful in the invention.

Throughout the views, the same reference numerals indicate the same or like parts.

It is a well known fact that automobiles are frequently stolen because insufficient precautions have been taken when parking a car, or because alarm systems used on many such cars have been rather too accessible and thus easily put out of commission by unauthorized parties. It is clear, then, that it is not sufficient to install an alarm system on an automobile, as usually connected to the ordinary signal horn or the like, and hence, it is, in addition, quite essential to have all parts of the alarm system inaccessible to all parties except the car owner, or at least, so inconvenient to reach that an unauthorized party will lose much time in attempting to locate and thereafter disconnect and silence the alarm signal.

With these considerations in mind and with the foregoing objects in view, the present invention is designed to render efficient and satisfactory service over a long period of time with constant use without danger of failure from breakdown or tampering.

Thus, in the practice of my invention, an automobile, represented diagrammatically by a chassis indicated generally at 1, has a conventional gear shift casing 2 and may have a gear shift handle 3, although panel board control may replace said handle. The storage battery 4 is preferably that used for the ordinary service of the car, and its one pole 5 is grounded to the frame 6 of the chassis 1, while the other pole 7 is connected to a special alarm horn 8. Another connection from this horn runs to a special switch 9, which is intended to be located in a secret position in the seat or in some other portion of the car exclusively known to the owner, or this special switch may be a key switch, controlled by his use of a key to open and to close it. The horn 8 is located beneath the car or somewhere on the same in as inconvenient and inaccessible a position as possible, so that neither the horn nor its connections are convenient to reach by any party attempting to tamper with the same.

Upon the upper part of the gear shift casing 2 is secured the cover 10, through which the shift handle or lever 3 extends. If the shift is of the panel type of control or without the shift handle, it is of no particular importance, so long as a cover or a part serving the part of a cover or the like is secured upon the casing to close the same. Beneath the cover is secured a special metal contact plate 11 which is sandwiched between two gaskets 12 and 13 of fibre, rubber, Bakelite, or any other suitable material. This contact plate may be made of copper, stainless steel, or of any suitable metal or alloy, but I have found that sheet steel serves very well as it offers good resilience in certain respects. Within the outline of the contact plate is at least one, but preferably several inwardly projecting contact members or fingers 14, 14 etc., which may be slightly bent down toward the inner ends for a reason which will immediately be explained. The plate is thus insulated from the gear shift casing and its cover while held between the same by having the cover fastened or screwed in place upon the casing over said plate. At this point it may be stated that the insulation may be some coating of insulating enamel or adherent non-conducting material applied to at least one side of the plate facing the gear shift casing, while the contact members on the latter may be integral with the plate or brazed, welded or even riveted on said plate, so long as said members are in good electrical connection with the same and mechanically at least fixed on said plate so as to be secure against accidental removal therefrom.

Within the gear shift casing is a group of conventional gear shifting forks 15, 15 as diagrammatically indicated in Figure 4, controlled by the handle 3 or by panel board controlled shift means of known type. The main point is that the forks are grounded as they are slidable on a shaft group 16, 16 or on other members which therefore tend to ground these forks to the casing and the frame of the chassis. The handle, if used, is also a means of grounding the forks.

However, if the forks occupy the neutral positions indicated in Figure 4, and the handle, as well, the circuit illustrated remains open, even if initially closed by the special switch 9. When the car owner is about to park or leave the car, the procedure is then for him to throw the gear shift into neutral, either by means of the handle 3 or by means of a panel control (not shown) and then to close switch 9.

Should an unauthorized party thereafter intend to steal the car, he naturally will not only attempt and perhaps succeed in starting the car engine by bringing a coil and its connection with him and temporarily installing the same on the car in loose fashion, but he will also attempt to move the car under its own power. In so doing, he will, of course operate the shift mechanism by means of handle 3 or the panel control, which at once causes one of the forks 15 to shift along its shaft in either one or the opposite direction in order to shift the gears accordingly. But it is evident that any movement of the shifting forks or members will cause the same to come into contact with one of the contact members or fingers 14, and this instantly and finally closes the circuit through horn 8, causing the same to sound loudly. It will be entirely indifferent whether the shifting occurs to low, high or intermediate speeds, or to any other, if there are more than three speeds, or to reverse position; for in every case the warning signal of the horn will sound so as to attract general attention of the public. The shifting members as they make contact with the ends of fingers 14 will tend to bend or arch the same a little, as they are already bent to a certain degree so as to spring back into shape when out of contact with the forks.

As already intimated, the two fibre or insulating gaskets can be first cemented to the gear shift casing and cover, respectively, or to both sides of the contact plate before the latter is interposed between said cover and casing. On the other hand, these insulating gaskets can be dispensed with altogether and the contact plate well enameled on one or both sides with a good insulating enamel or dissolved plastic of any suitable description, so that electrical contact with the casing and/or cover is prevented. The casing and cover could also be similarly enameled instead of the plate, the ultimate result being the same in any case.

It is to be noted that inasmuch as the warning horn is intended to be entirely independent and distinct from the regular signal horn of the car operated in conventional manner by a button on the steering column or wheel or even elsewhere, the special or auxiliary warning horn can have a very distinctive sound which will attract attention to the fact that something is amiss when it sounds.

Upon hearing the signal of this special horn, the thief will either throw the shift back into neutral and desist from any further attempts at stealing the car and will instead make sure of his escape, or he will try to locate the horn or its connections, but as this horn is well nigh inaccessible, so much time will be lost in attempting to reach it and the parts of the system connected thereto will also require such inconvenient attention that the thief will much rather run away than attempt anything further, and thus the car will be effectively protected against loss by theft, even on the open street.

Manifestly, variations may be resorted to and parts and features modified and used without others within the scope of the appended claims.

Having now fully described my invention, I claim:

1. A switch for an electric automobile alarm system, comprising a metal contact plate adapted to be connected to a signal circuit and having gaskets including insulating material disposed upon both sides thereof and being located between the gear shift casing and the cover of said casing, and one or more inwardly projecting contact members extending integrally from said contact plate into the space within said gear shift casing and in the path of the shifting members for the gears therein, said contact members being spaced a sufficient distance from said shifting members to allow the same to remain out of contact, contact members in neutral shift position and to make effective electrical contact between one of said contact members and one of said shifting members upon shifting of the gears from neutral to any one of the various speeds or to the reverse position of the gear shift mechanism.

2. A switch for an electric automobile burglar alarm, comprising a metal plate or gasket supported upon a portion of the gear shift casing, having an open area corresponding to the interior of said gear shift casing and having one or more spaced resilient contact fingers secured upon said plate and projecting into said casing within the outline of said plate, said contact fingers being disposed in the path of the gear shifting forks or members within the casing, the shifting of one of said members to mesh any of the gears in said casing producing electrical contact between the one member involved and the adjacent contact finger of the metal plate, and means insulating said plate from the gear shift casing.

3. A switch according to claim 2, having the contact fingers integral with the metal contact plate.

4. A switch according to claim 2, in which the means insulating the plate from the gear shift casing includes insulating material coated upon both sides of said metal plate in order to insulate the same from both the casing and the cover thereof.

5. A switch according to claim 2, in which the resilient contact fingers are bent downwardly toward their free ends to make the same resiliently compressible upon said ends when making contact with the shifting members within the casing.

6. A switch according to claim 2, in which the means insulating the plate from the gear shift casing includes insulating material coated upon at least one side of said plate facing said gear shift casing.

ERHARD MEIEROTT.